Feb. 6, 1934.    H. P. DEN BOER    1,945,886
CONVEYING DEVICE FOR USE IN BAKERIES
Filed Aug. 5, 1933    2 Sheets-Sheet 1

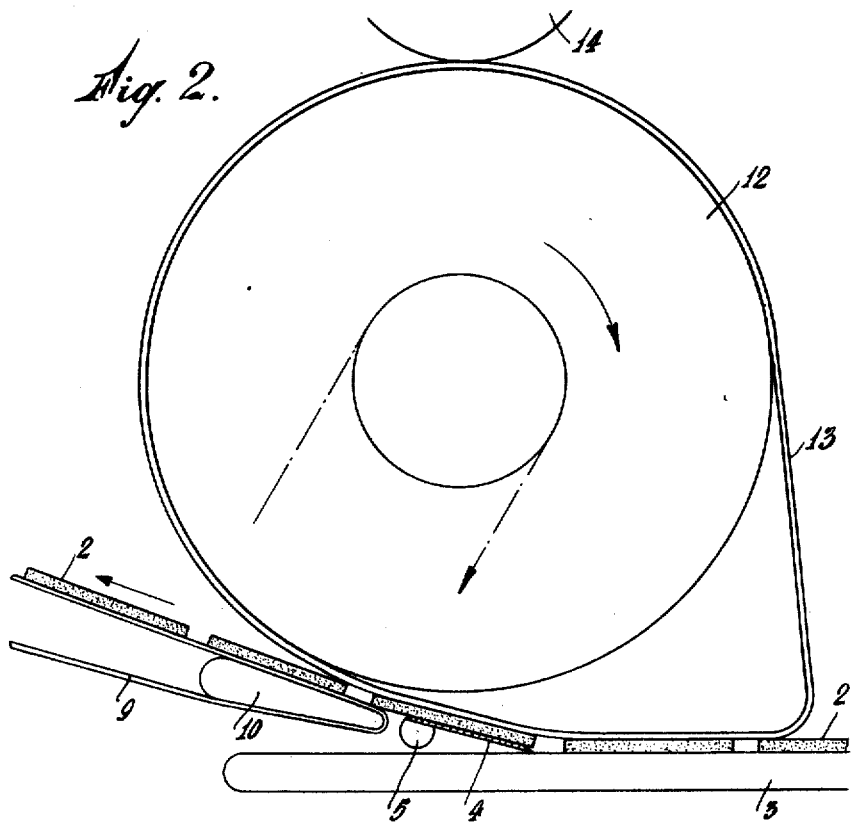
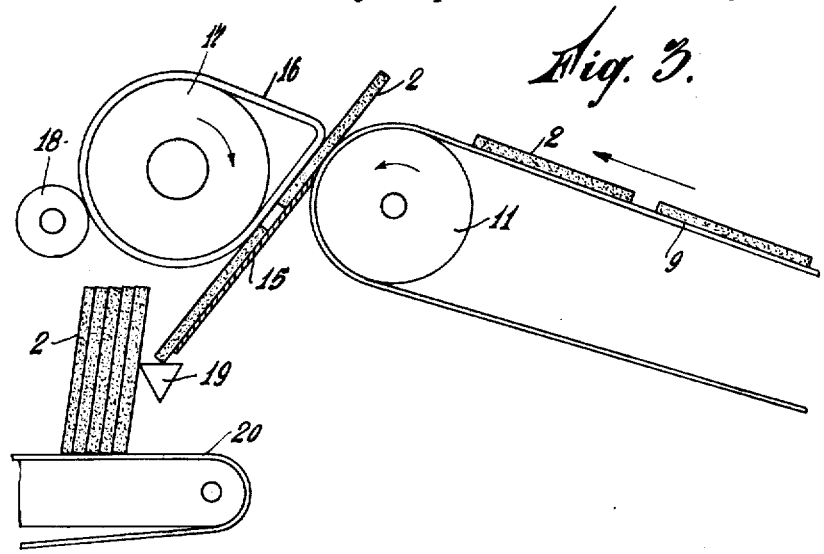

Patented Feb. 6, 1934

1,945,886

UNITED STATES PATENT OFFICE 1,945,886

CONVEYING DEVICE FOR USE IN BAKERIES

Hendrik Pieter den Boer, Dordrecht, Netherlands, assignor to Naamlooze Vennotschap: Bakovenbouw, voorheen H. P. den Boer, Dordrecht, Netherlands, a corporation of the Netherlands Application August 5, 1933, Serial No. 683,836, and in the Netherlands June 17, 1932

4 Claims. (Cl. 198—25)

In bakeries using complete or partial mechanical conveying means for their products, it is always a problem for which up to the present no satisfactory solution has been found, how best to convey the products from one part of the transportation device, e. g. from an endless conveyor belt, to a subsequent part, e. g. a second endless conveyor belt or to a device for further treating, sorting or arranging the said products.

It has been proposed to effect this transportation by bridging-over the distance between the two parts of the device by means of a stationary surface and pushing the bakery products, e. g. biscuits or so-called "cookies", over the said surface by means of rotating brushes arranged above the same.

This method however has the drawback that the movement of the biscuits over the surface is dependent on the dimensions and the weight of the same, and as these considerations are never the same for each individual product, the regular arrangement of the same will be broken and there will always be a danger of damaging or deforming the products.

According to the present invention these objections are removed by the use of an endless belt arranged on a roller placed above the stationary surface with sufficient slackness so as to rest on top of the bakery products to be conveyed, and to push the same along over the said surface when the said belt is actuated by the rotation of the roller.

In order to ensure that the belt is moved in accordance with the peripheral speed of the roller, the belt may be held on the roller by means of a pressure roller.

The device will be most effective when the speed of the belt equals the speed with which the bakery products are fed to the stationary device.

The accompanying drawings show by way of example, one construction according to the invention.

Fig. 2 shows a part of the device on a larger scale, and

Figure 1:
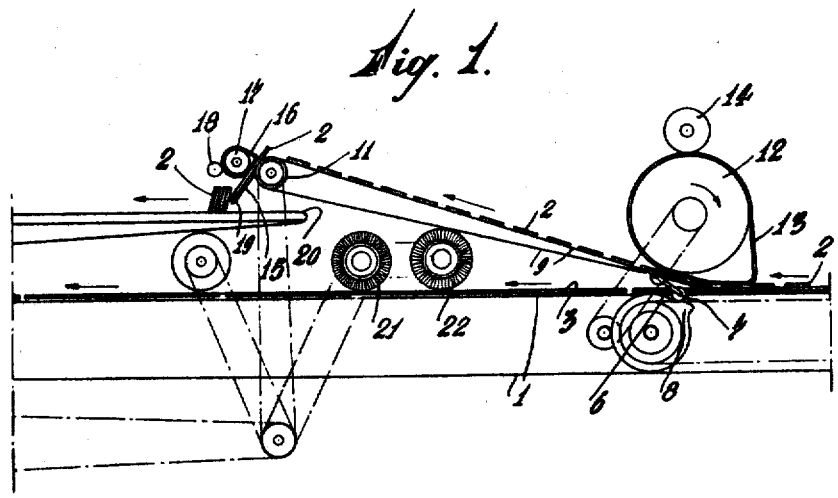
Fig. 1 is a diagrammatical view of a device for conveying the biscuits or so-called "cookies" leaving the cooling device of the oven, to a device for arranging the products in a position ready for packing.

Fig. 3 another part on a larger scale.

The conveying means by which the bakery products are fed from the cooling device of the oven comprises an endless belt or chain 1, a part of which, situated at the side of the oven, is omitted in the drawings. In the embodiment shown the bakery products 2 are fed from the oven on baking sheets 3.

The device for lifting the products from the baking sheets comprises an inclined sheet or plate 4 (Fig. 2) extending over the full width of the baking sheets, the lower edge of the inclined plate resting each time on a baking sheet, whilst the upper edge is attached to a rotatable shaft 5.

In order to prevent the lower edge of the plate 4 from touching the endless belt 1 between two baking sheets, so that the next baking sheet would butt against the said plate 4, there is provided on the shaft 5 an arm 6 (Fig. 1) having a roller 7 supported by a cam disc 8 driven in such a way that the plate 4 is lifted up each time between two baking sheets.

The plate 4 may consist of contiguous strips, or be provided with incisions, so that its lower edge may be resiliently pressed against the baking sheets over their entire width and there is no edge against which the bakery products can butt.

At the upper end of the plate 4, there abuts an endless belt 9 which is conducted over a sliding bar 10, the other end of the belt passing over a roller 11 by means of which it is driven.

Above the plate 4, the upper side of which forms a stationary surface over which the biscuits are to be conveyed from the baking sheets 3 to the conveyor belt 9, there is rotatably arranged a roller 12 around which passes an endless belt 13 consisting of rubber of a thickness of approximately 2 millimetres, the said belt being actuated by the rotation of the roller 12 in the direction of the arrow.

The belt 13 surrounds the roller 12 with so much slackness as to rest on the bakery products, when the same have reached the plate 4, thus pushing them on to the said plate. The belt is so arranged as to push, when in motion, the bakery products upwards along the plate 4 and on to the belt 9.

The belt 13 is pressed against the roller 12 by means of a pressure roller 14, so that the belt 13 is actuated in accordance with the peripheral speed of the roller 12 in such a way that the speed of the belt 13 is equal to the speed with which the baking sheets are being fed, which speed is again equal to that of the conveyor belt 9 by means of which the bakery products are further conveyed.

The belt 9 serves to convey the biscuits to a device which places them on end in rows ready for packing.

At the end of the conveying belt 9 and adjacent to the roller 11 the biscuits reach a stationary inclined plate 15. By means of a rubber belt 16 on a driven roller 17, to which the belt is held by means of a pressure roller 18, the biscuits are compelled to move downwardly with a given speed on to the upper surface of a revolving prism-shaped member 19, the said surface at that moment lying horizontal or approximately horizontal.

The speed of the rubber belt 16 is preferably equal to that of the conveyor belt 9 by means of which the bakery products are being fed.

By a turn of the prism-shaped member the arriving biscuits or "cookies" are placed each time at the end of the row, the said biscuits resting on a moving endless belt 20 from which they are removed for packing.

It is evident that the baking sheets after the removal of the biscuits are further conveyed by the belt on which they are resting.

In the present installation the baking sheets are cleaned at the same time by means of rotating brushes 21, 22 arranged below the conveyor belt 9, upon which at the end of the belt 1 they can be removed, cleaned and sufficiently cooled for subsequent use.

I claim:

1. A device for conveying bakery products over a stationary surface comprising an endless belt arranged on a roller which is placed above the said stationary surface, the said belt being allowed sufficient slackness so as to rest on top of the bakery products to be conveyed and to push the same along with it when the said belt is actuated by the rotation of the roller.

2. A device according to claim 1, characterized in that the endless belt is held upon the roller by means of a pressure roller.

3. A device for conveying bakery products over a stationary surface, comprising an endless belt for feeding the bakery products to a location adjacent said stationary surface, and a second endless belt, a roll on which said second endless belt is disposed, above said stationary surface, sufficient slackness being provided in said second endless belt so that it will rest on top of the bakery products and will push them along when the belt is actuated by the rotation of the roll, the rotational speed of said roller corresponding to the speed of the first-mentioned endless or feeding belt.

4. A device for conveying bakery products over a stationary surface, comprising an endless belt for feeding the bakery products to a location adjacent said stationary surface, a second endless belt, a roll on which said second endless belt is disposed, above said stationary surface, sufficient slackness being provided in said second endless belt so that it will rest on top of the bakery products and will push them along when the belt is actuated by the rotation of the roll, the rotational speed of said roller corresponding to the speed of the first-mentioned endless or feeding belt, and a pressure roller abutting said first-mentioned roller to hold said second endless belt upon the said first-mentioned roller.

HENDRIK PIETER den BOER.

CERTIFICATE OF CORRECTION.

Patent No. 1,945,886.    February 6, 1934.

HENDRIK PIETER den BOER.

It is hereby certified that the second word in the name of the assignee in the above numbered patent was erroneously described and specified as "Vennotschap" whereas said name should have been described and specified as Vennootschap, as shown by the records of assignments in this office; and that the said Letters Patent should be read with this correction therein that the same may conform to the record of the case in the Patent Office.

Signed and sealed this 19th day of June, A. D. 1934.

Bryan M. Battey (Seal)    Acting Commissioner of Patents.

inclined plate 15. By means of a rubber belt 16 on a driven roller 17, to which the belt is held by means of a pressure roller 18, the biscuits are compelled to move downwardly with a given speed on to the upper surface of a revolving prism-shaped member 19, the said surface at that moment lying horizontal or approximately horizontal.

The speed of the rubber belt 16 is preferably equal to that of the conveyor belt 9 by means of which the bakery products are being fed.

By a turn of the prism-shaped member the arriving biscuits or "cookies" are placed each time at the end of the row, the said biscuits resting on a moving endless belt 20 from which they are removed for packing.

It is evident that the baking sheets after the removal of the biscuits are further conveyed by the belt on which they are resting.

In the present installation the baking sheets are cleaned at the same time by means of rotating brushes 21, 22 arranged below the conveyor belt 9, upon which at the end of the belt 1 they can be removed, cleaned and sufficiently cooled for subsequent use.

I claim:

1. A device for conveying bakery products over a stationary surface comprising an endless belt arranged on a roller which is placed above the said stationary surface, the said belt being allowed sufficient slackness so as to rest on top of the bakery products to be conveyed and to push the same along with it when the said belt is actuated by the rotation of the roller.

2. A device according to claim 1, characterized in that the endless belt is held upon the roller by means of a pressure roller.

3. A device for conveying bakery products over a stationary surface, comprising an endless belt for feeding the bakery products to a location adjacent said stationary surface, and a second endless belt, a roll on which said second endless belt is disposed, above said stationary surface, sufficient slackness being provided in said second endless belt so that it will rest on top of the bakery products and will push them along when the belt is actuated by the rotation of the roll, the rotational speed of said roller corresponding to the speed of the first-mentioned endless or feeding belt.

4. A device for conveying bakery products over a stationary surface, comprising an endless belt for feeding the bakery products to a location adjacent said stationary surface, a second endless belt, a roll on which said second endless belt is disposed, above said stationary surface, sufficient slackness being provided in said second endless belt so that it will rest on top of the bakery products and will push them along when the belt is actuated by the rotation of the roll, the rotational speed of said roller corresponding to the speed of the first-mentioned endless or feeding belt, and a pressure roller abutting said first-mentioned roller to hold said second endless belt upon the said first-mentioned roller.

HENDRIK PIETER den BOER.

CERTIFICATE OF CORRECTION.

Patent No. 1,945,886.   February 6, 1934.

HENDRIK PIETER den BOER.

It is hereby certified that the second word in the name of the assignee in the above numbered patent was erroneously described and specified as "Vennotschap" whereas said name should have been described and specified as Vennootschap, as shown by the records of assignments in this office; and that the said Letters Patent should be read with this correction therein that the same may conform to the record of the case in the Patent Office.

Signed and sealed this 19th day of June, A. D. 1934.

Bryan M. Battey (Seal)   Acting Commissioner of Patents.